United States Patent
Schydlo

(10) Patent No.: US 9,896,986 B2
(45) Date of Patent: Feb. 20, 2018

(54) METHOD AND APPARATUS FOR OPERATING AN INTERNAL COMBUSTION ENGINE

(71) Applicant: MAN Truck & Bus AG, Munich (DE)

(72) Inventor: Alexander Schydlo, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/277,994

(22) Filed: May 15, 2014

(65) Prior Publication Data

US 2014/0352296 A1    Dec. 4, 2014

(30) Foreign Application Priority Data

May 31, 2013    (DE) .......................... 10 2013 009 219

(51) Int. Cl.

| | |
|---|---|
| *F01N 5/02* | (2006.01) |
| *F02B 73/00* | (2006.01) |
| *F02G 1/043* | (2006.01) |
| *F02G 5/02* | (2006.01) |
| *F01K 23/06* | (2006.01) |
| *F01K 23/10* | (2006.01) |
| *F01K 23/14* | (2006.01) |

(52) U.S. Cl.
CPC .............. *F01N 5/02* (2013.01); *F01K 23/065* (2013.01); *F01K 23/10* (2013.01); *F01K 23/14* (2013.01); *F01N 5/025* (2013.01); *F02B 73/00* (2013.01); *F02G 1/043* (2013.01); *F02G 5/02* (2013.01); *F02G 2254/15* (2013.01); *F02G 2260/00* (2013.01); *F02G 2262/00* (2013.01); *F02G 2280/20* (2013.01); *F02G 2280/70* (2013.01); *Y02E 20/363* (2013.01); *Y02T 10/166* (2013.01)

(58) Field of Classification Search
CPC .................................. F01N 5/02; F02B 73/00
See application file for complete search history.

(56) References Cited

U.S. PATENT DOCUMENTS

| | | | |
|---|---|---|---|
| 4,235,077 A | 11/1980 | Bryant | |
| 4,392,351 A * | 7/1983 | Doundoulakis | ....... F01C 11/004 165/169 |
| 4,481,771 A | 11/1984 | Meijer et al. | |
| 6,589,130 B1 * | 7/2003 | Baginski | ................ B60K 6/365 180/65.25 |

(Continued)

FOREIGN PATENT DOCUMENTS

| | | |
|---|---|---|
| DE | 202008000832 U1 | 3/2008 |
| DE | 102007054197 A1 | 5/2009 |

(Continued)

OTHER PUBLICATIONS

European Search Report dated Feb. 10, 2015 for corresponding application EP 14 00 0133.

*Primary Examiner* — Mark Laurenzi
*Assistant Examiner* — Mickey France
(74) *Attorney, Agent, or Firm* — Lucas & Mercanti, LLP

(57) ABSTRACT

A method and apparatus for operating an internal combustion engine, in particular for commercial vehicles, having a fuel/air feed device and a downstream exhaust system, wherein, to achieve improved efficiency, the exhaust gas enthalpy in the exhaust gas flow of the internal combustion engine is used to operate a heat engine, in particular a Stirling engine, which produces mechanical energy.

12 Claims, 1 Drawing Sheet

(56) References Cited

U.S. PATENT DOCUMENTS

| | | | |
|---|---|---|---|
| 7,076,941 B1 | 7/2006 | Hoffman et al. | |
| 2002/0017098 A1 | 2/2002 | Johansson | |
| 2004/0221577 A1 | 11/2004 | Yamaguchi et al. | |
| 2004/0237508 A1* | 12/2004 | Yamazaki | F01N 3/0835 60/277 |
| 2007/0227144 A1* | 10/2007 | Yaguchi | F01K 23/065 60/616 |
| 2008/0141921 A1* | 6/2008 | Hinderks | 114/274 |
| 2009/0007562 A1* | 1/2009 | Carroll | 60/597 |
| 2010/0024859 A1* | 2/2010 | Bell | F01N 5/025 136/201 |
| 2010/0043427 A1 | 2/2010 | Sawada et al. | |
| 2010/0146962 A1* | 6/2010 | Yaguchi | F02G 1/043 60/520 |
| 2010/0274396 A1* | 10/2010 | Yang | B60H 1/00385 700/278 |
| 2010/0275594 A1* | 11/2010 | Katayama et al. | 60/597 |
| 2012/0031079 A1 | 2/2012 | Spicer et al. | |
| 2012/0198819 A1* | 8/2012 | Pursifull | F16H 57/0413 60/273 |
| 2012/0285170 A1* | 11/2012 | Mori | B60H 1/3227 60/670 |
| 2013/0269343 A1* | 10/2013 | Kobylecky | F01N 5/02 60/615 |
| 2014/0283506 A1* | 9/2014 | Kuroki | B32B 15/015 60/320 |

FOREIGN PATENT DOCUMENTS

| | | | | |
|---|---|---|---|---|
| GB | 2437309 A | * | 10/2007 | F01P 5/04 |
| GB | 2474021 A | | 4/2011 | |
| JP | 2005306280 A | * | 11/2005 | F28D 15/0266 |

\* cited by examiner

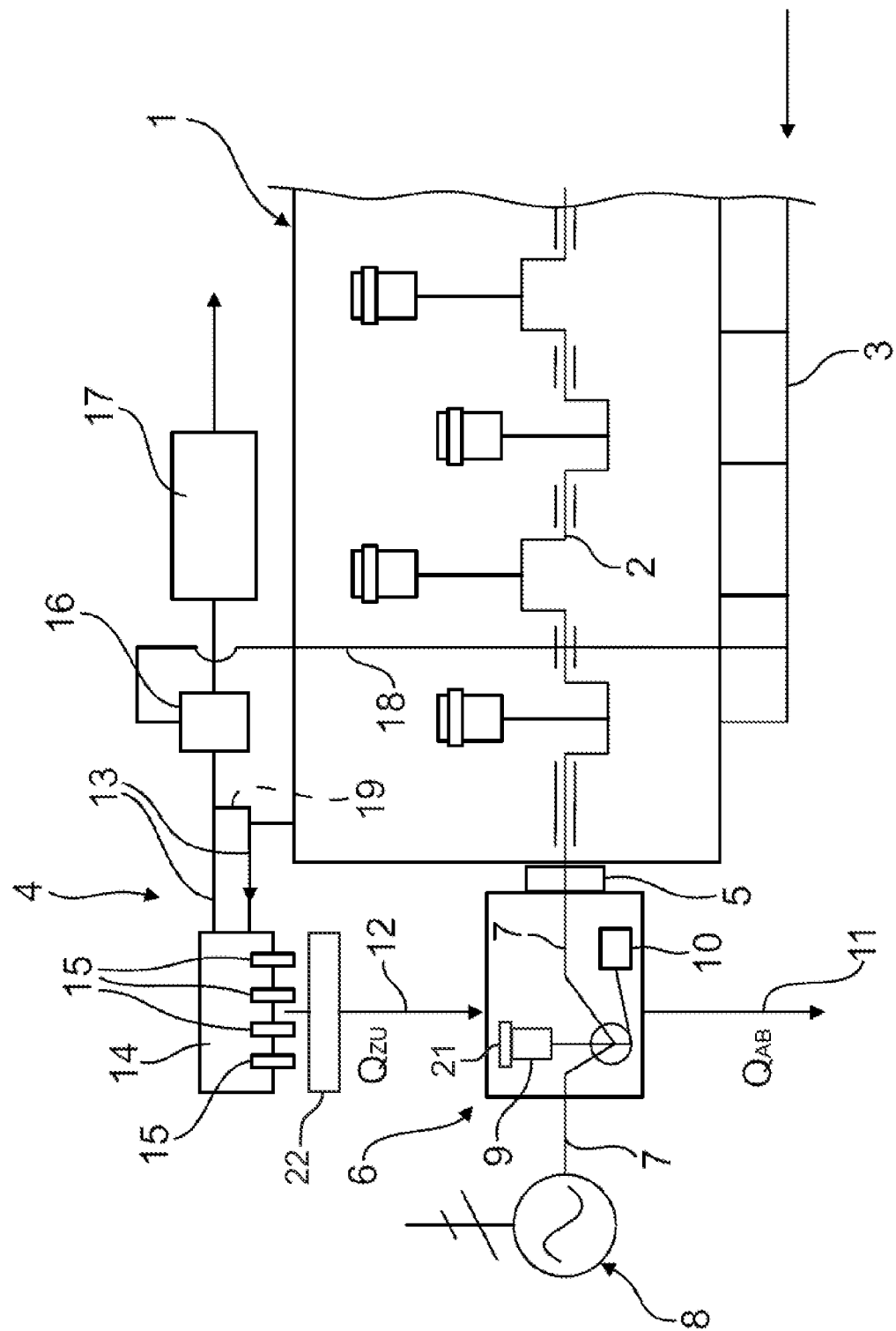

METHOD AND APPARATUS FOR OPERATING AN INTERNAL COMBUSTION ENGINE

CROSS-REFERENCE TO RELATED APPLICATIONS

This application claims the priority of DE 10 2013 009 219.1 filed May 31, 2013 which is incorporated by reference herein.

BACKGROUND OF THE INVENTION

The present invention relates to a method for operating an internal combustion engine, to an apparatus for carrying out the method and to an internal combustion engine suitable for the method.

Internal combustion engines, particularly in motor vehicles or commercial vehicles, are often designed as diesel engines for reasons of efficiency and, to meet environmental regulations, have exhaust gas aftertreatment devices, such as SCR catalytic converters and/or exhaust gas recirculation devices. In this case, it is not possible to make optimum use of the exhaust gas enthalpy contained in the exhaust gas of the internal combustion engine. Moreover, high exhaust gas recirculation rates impose a load on the cooling circuit of the internal combustion engine, which are generally liquid-cooled internal combustion engines, due to the required re-cooling of the exhaust gases by means of appropriate exhaust gas coolers, if appropriate in combination with additional low-temperature circuits.

BRIEF SUMMARY OF THE INVENTION

It is the object of the invention to specify a method for operating an internal combustion engine that improves exhaust gas enthalpy and raises the efficiency of the internal combustion engine. It is another object of the invention to provide an apparatus for carrying out the method as well as an internal combustion engine suitable for the method, in particular for commercial vehicles.

According to the invention, it is proposed that the exhaust gas enthalpy in the exhaust gas flow of the internal combustion engine is used to operate a heat engine, in particular a Stirling engine, which produces mechanical energy.

In this way, it is possible essentially to achieve two advantages, namely, on the one hand, use of the waste heat contained in the exhaust gas and, on the other hand, lowering of the exhaust gas temperatures downstream of the point of removal of the heat, which may improve the thermal economy of the internal combustion engine, making it possible, for example, to dispense with a low-temperature circuit.

The use of a Stirling engine (also referred to as a hot gas engine) as a heat engine, which can be of any construction known per se with a closed circuit and which converts heat into mechanical energy, is particularly advantageous. For the sake of simplicity, reference will always be made below to a Stirling engine as a preferred heat engine. However, it is self-evident that the term "Stirling engine" is then to be understood here expressly in a broad sense and is in each case representative of any heat engine suitable for carrying out the method according to the invention in which a working medium, in particular a working gas (e.g. air, helium or hydrogen), is heated and cooled in order to perform mechanical work.

The Stirling engine can be used to drive an electric machine (preferably a generator) and thus to produce electric current; however, the machine can also be connected as a starter, if appropriate.

As an alternative or in addition, the drive shaft of the heat engine can be coupled to the crankshaft of the internal combustion engine and can thus feed in a superimposed drive torque, particularly in part-load and/or full-load operation of the internal combustion engine. In this case, the speed of the drive shaft of the Stirling engine can be adapted by means of a speed governor to the instantaneous speed of the crankshaft of the internal combustion engine for optimum efficiency.

The exhaust gas enthalpy in the exhaust gas flow of the internal combustion engine is preferably transferred as driving heat flow $Q_{ZU}$ to the heat engine, either indirectly, in particular via at least one interposed intermediate heat exchanger, or directly. In an advantageous development thereof, at least one heat pipe, preferably a plurality of heat pipes, can be inserted into an exhaust line of the exhaust system of the internal combustion engine (for reasons of clarity, the plural "heat pipes" will always be used below by way of example), supplying the Stirling engine, preferably a heat exchanger or heat exchange region assigned to the working piston of the Stirling engine, with the driving heat flow $Q_{ZU}$ and hence with driving energy, either indirectly, in particular via at least one interposed intermediate heat exchanger, or directly. This makes possible heat transfer to the Stirling engine in a manner that is well adapted in terms of construction and is efficient. As an alternative, however, it is also possible for there to be an exhaust line branching off, the heat flow of which flows through the Stirling engine or a heat exchanger or heat exchange region of the Stirling engine.

In the case of an internal combustion engine having an exhaust gas recirculation device, a particularly preferred possibility is for the heat pipes to be arranged upstream of the exhaust gas branch point for the exhaust gas recirculation device, with the result that the associated drop in temperature of the exhaust gas means that less exhaust gas cooling is required, which may even eliminate the need for an exhaust gas cooler in the recirculation line.

Moreover, in the case of a catalytic exhaust gas aftertreatment device in the exhaust system of the internal combustion engine, the heat pipes can be provided upstream of the aftertreatment device, in particular in order in this way to be able to divert a larger amount of driving energy or a higher driving heat flow to the Stirling engine when required. If appropriate, temperature control of the exhaust gas (e.g. by means of bypass lines) could also be provided in the exhaust system in order to bypass the heat pipes and preferentially supply the aftertreatment device in the case of low exhaust gas temperatures (cold starting), for example.

A particularly preferred apparatus for carrying out the method on an internal combustion engine having a fuel/air feed device and a downstream exhaust system consists in that the exhaust system is coupled for heat transfer, via at least one heat pipe, in particular via a plurality of heat pipes integrated into said system, to a heat engine or a Stirling engine, which produces electrical and/or mechanical energy. In this case, the Stirling engine can drive an electric machine and/or the drive shaft of said Stirling engine can be coupled to the crankshaft of the internal combustion engine.

The heat sink of the Stirling engine can furthermore preferably be cooled by relative wind of the motor vehicle and/or be connected via a heat exchanger to the liquid cooling system of the internal combustion engine.

In another embodiment of the invention it is possible, in the case of an internal combustion engine with an exhaust gas aftertreatment device and/or an exhaust gas recirculation device, for the heat pipes for the Stirling engine to be integrated into an exhaust casing of the exhaust system, which is positioned upstream of the exhaust gas aftertreatment device and/or of the exhaust gas recirculation discharge line. Here, the exhaust gas aftertreatment device can be formed by an SCR catalytic converter.

Finally, an internal combustion engine, in particular for commercial vehicles, having the features presented above, and a vehicle, in particular a commercial vehicle, are preferably proposed.

BRIEF DESCRIPTION OF THE DRAWINGS

An illustrative embodiment of the invention is explained in greater detail below by means of the attached, roughly schematic drawing.

FIG. 1 is a block diagram of an internal combustion engine with an apparatus according to an embodiment of the claimed invention.

DETAILED DESCRIPTION OF THE PREFERRED EMBODIMENTS

In FIG. 1, a multi-cylinder reciprocating piston internal combustion engine 1 such as a diesel engine for a commercial vehicle which, where not described, can be of conventional construction has a crankshaft 2 and the output from the crankshaft 2 drives the other driving devices in the motor vehicle.

The internal combustion engine 1 has a fuel/air feed device, merely indicated, having an intake manifold 3 and an exhaust system 4 carrying the exhaust gases away, which, where not described, is of known construction. If appropriate, an exhaust gas turbocharging system having at least one exhaust turbine could also be provided in the exhaust system 4.

A Stirling engine 6 is coupled to the internal combustion engine 1 or to the crankshaft 2 thereof via a clutch and a speed governor 5, for example, the drive shaft 7 of said Stirling engine on the one hand being connected in terms of drive to the crankshaft 2 and on the other hand driving an electric machine 8, e.g. a three-phase generator.

In the illustrative embodiment, the Stirling engine 6 is designed as an alpha type, for example, having a working piston 9 and a displacer piston 10, the cylinders (not shown) of which, which are offset by 90° to one another, correspond to one another in a known manner in a gas circuit closed to a greater or lesser extent, wherein the cylinder of the displacer piston 10 is cooled in a known manner, being embodied as a heat sink ($Q_{AB}$) (merely indicated by the arrow 11), while the cylinder of the working piston 9, or a heat exchanger 22 connected thereto, is heated by supplying heat ($Q_{ZU}$). However, the Stirling engine 6 could also be embodied in a known manner as a beta type with coaxial cylinders or as a gamma type.

Cooling $Q_{AB}$ is accomplished either by relative wind, e.g. by arranging cooling ribs on the cylinder of the displacer piston 10, and/or by liquid cooling, with the cylinder 10 or a corresponding heat exchanger being connected to the cooling liquid system (not shown) of the internal combustion engine 1.

To heat the cylinder of the working piston 9 of the Stirling engine 6 (arrow 12), a plurality of heat pipes 15 is inserted into the exhaust system 4 or into an exhaust line 13 coming out of the combustion chambers of the internal combustion engine 1 in an exhaust casing 14, said pipes transferring the exhaust gas enthalpy or waste heat of the exhaust gas to the Stirling engine 6, either directly or indirectly, e.g., by means of an intermediate heat exchanger 21.

A diversion point or exhaust gas recirculation valve 16 of an exhaust gas recirculation device (not shown specifically) of the internal combustion engine 1, followed in the direction of flow by an exhaust gas aftertreatment device having an SCR catalytic converter 17 (selective catalytic reduction), is arranged in the exhaust system 4 downstream of the exhaust casing 14 with the heat pipes 15.

Exhaust gas can be recirculated to the intake manifold 3 of the internal combustion engine 1 at defined rates via the exhaust gas recirculation valve 16 and an exhaust gas recirculation line 18. If appropriate, an exhaust gas cooler connected to the liquid cooling system of the internal combustion engine 1 can be provided in the exhaust gas recirculation line 18.

Given the arrangement of appropriate clutches (not shown) on the drive shaft 7, the Stirling engine 6 can be used to supply the driving energy produced by thermal coupling to the crankshaft 2 and/or to the electric machine 8 for producing electric power and into the on-board electrical system of a motor vehicle. If appropriate, the machine 8 can also be connected as an electric motor and serve as a starter motor or can supply additional driving energy in a boost mode.

If appropriate, means, such as a controllable bypass line 19 (indicated in broken lines), which effect bypassing of the heat pipes 15, can be provided in the exhaust system 4 or exhaust line 13. It is thereby possible to achieve a rise in the temperature for the SCR catalytic converter 17 with a higher priority when cold starting the internal combustion engine 1, for example.

LIST OF REFERENCE SIGNS 1 internal combustion engine
2 crankshaft
3 intake manifold
4 exhaust system
5 speed governor
6 Stirling engine
7 drive shaft
8 electric machine
9 working piston
10 displacer piston
11 heat dissipation $Q_{AB}$ (heat sink of the Stirling engine)
12 heat supply $Q_{ZU}$ (heat source of the Stirling engine)
13 exhaust line
14 exhaust casing
15 heat pipes
16 exhaust gas recirculation valve
17 SCR catalytic converter
18 exhaust gas recirculation line
19 bypass line

The invention claimed is:

1. A method for operating an internal combustion engine in a motor vehicle, the internal combustion engine having a fuel/air feed device and a downstream exhaust system including an exhaust line passing through an exhaust casing, the exhaust line having a first exhaust gas line passing from the internal combustion engine to the exhaust casing and a second exhaust gas line passing from the exhaust casing to an exhaust gas aftertreatment device with an exhaust gas recirculation valve disposed in the second exhaust gas line upstream of the exhaust gas aftertreatment device, the exhaust gas recirculation valve being part of an exhaust gas recirculation device of the internal combustion engine, the method comprising:

directing exhaust gas enthalpy from an exhaust gas flow of the internal combustion engine to a heat engine using the first exhaust gas line and a plurality of heat pipes inserted in the exhaust casing, each of the heat pipes having a first end inserted in the exhaust casing and a second end connected directly to the heat engine, such that the exhaust gas enthalpy is received by the first end of the each of the heat pipes from the exhaust gas flow and delivered to the heat engine through the second end of the each of the heat pipes, wherein the heat pipes in the exhaust casing are arranged upstream of the exhaust gas recirculation valve;

reducing a temperature of the exhaust gas flow by the heat pipes so that an entire temperature drop of the exhaust gas required for recirculating the exhaust gas to an intake manifold of the internal combustion engine is provided by the heat pipes, whereby an exhaust gas recirculation line from the exhaust gas recirculation valve to the intake manifold is provided without an exhaust gas cooler;

using the exhaust gas enthalpy to operate the heat engine and produce mechanical energy; and bypassing the heat pipes using a controllable bypass to achieve a rise in temperature for the catalytic exhaust gas aftertreatment device, the bypass being connected between the first exhaust line and the second exhaust line, and being connected to the second exhaust line upstream of the exhaust gas recirculation valve.

2. The method of claim 1, further comprising using the mechanical energy produced by the heat engine to drive an electrical machine.

3. The method of claim 1, further comprising coupling a drive shaft of the heat engine to a crankshaft of the internal combustion engine; and adapting, by a speed governor, a speed of the drive shaft of the heat engine to an instantaneous speed of the crankshaft of the internal combustion engine.

4. The method of claim 1, wherein the step of directing the exhaust gas enthalpy includes transferring the exhaust gas enthalpy as driving heat flow to the heat engine.

5. An apparatus on an internal combustion engine of a motor vehicle having a fuel/air feed device and a downstream exhaust system, the apparatus comprising:

an exhaust gas line comprising a first exhaust gas line passing from the internal combustion engine to an exhaust casing and a second exhaust gas line passing from the exhaust casing to an exhaust gas aftertreatment device, the second exhaust gas line having an exhaust gas recirculation valve for an exhaust gas recirculation device of the internal combustion engine, the exhaust gas recirculation valve being disposed upstream of the exhaust gas aftertreatment device;

a plurality of heat pipes inserted into the exhaust casing, each of the heat pipes having a first end and a second end, the first end being inserted into the exhaust casing, wherein the heat pipes are arranged upstream of the exhaust gas recirculation valve;

a heat engine coupled directly to the second end of the each of the heat pipes such that exhaust gas enthalpy from the exhaust system is received by the first end and delivered to the heat engine through the second end of the each of the heat pipes, the heat engine producing at least one of electrical and mechanical energy from the exhaust gas enthalpy, wherein the heat pipes reduce the temperature of the exhaust gas flow so that an entire temperature drop of the exhaust gas required for recirculating the exhaust gas to an intake manifold of the internal combustion engine is provided by the heat pipes, whereby an exhaust gas recirculation line from the exhaust gas recirculation valve to the intake manifold is provided without an exhaust gas cooler; and a controllable bypass selectively bypassing the heat pipes, the controllable bypass being connected between the first exhaust line and the second exhaust line, and being connected to the second exhaust line upstream of the exhaust gas recirculation valve.

6. The apparatus of claim 5, wherein the heat engine is a Stirling engine.

7. The apparatus of claim 5, wherein the heat pipes provides a driving heat flow to the heat engine.

8. The apparatus of claim 5, wherein the heat engine drives an electrical machine.

9. The apparatus of claim 5, wherein the heat engine includes a drive shaft coupled to a crankshaft of the internal combustion engine.

10. An internal combustion engine comprising a fuel/air feed device, a downstream exhaust system, and the apparatus of claim 5.

11. A vehicle comprising an internal combustion engine with a fuel/air feed device, a downstream exhaust system, and the apparatus of claim 5.

12. The apparatus of claim 5, wherein the heat engine has an output shaft that is coupled to both an electrical machine and a crankshaft of the internal combustion engine.

\* \* \* \* \*